C. M. EASON.
DYNAMOMETER RECORDING INSTRUMENT.
APPLICATION FILED MAY 20, 1920.
1,417,461.
Patented May 23, 1922.
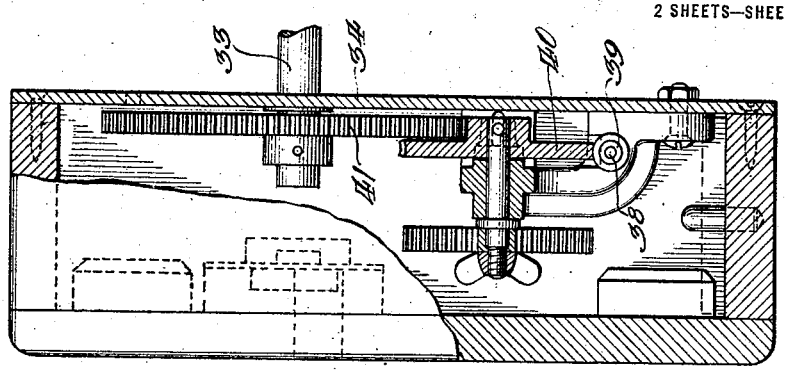
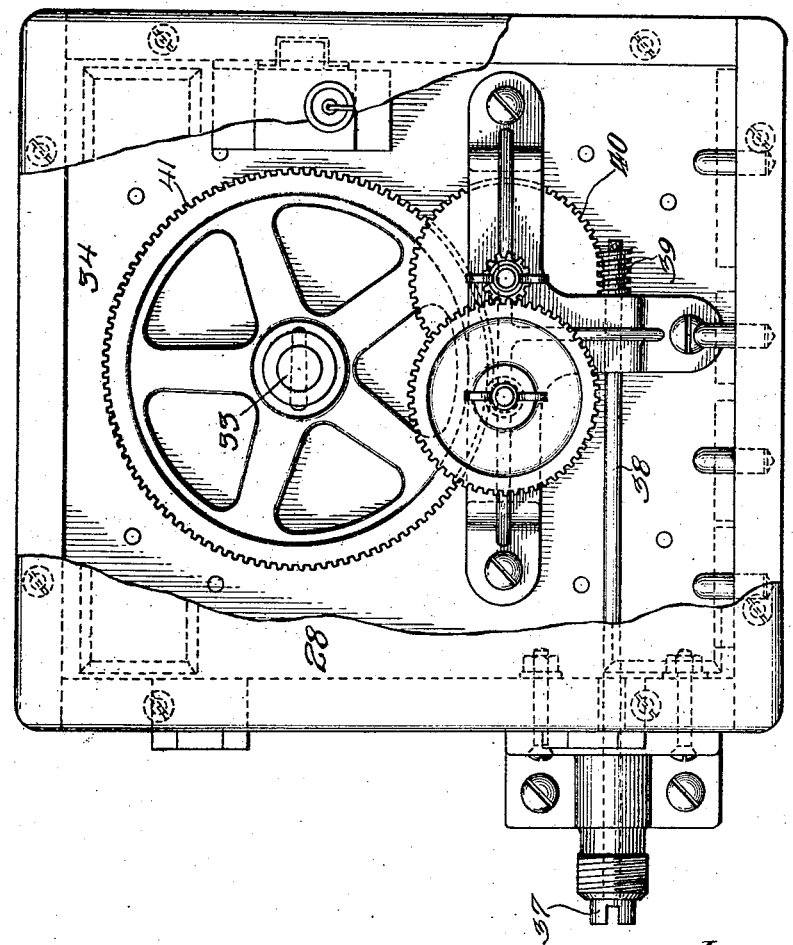

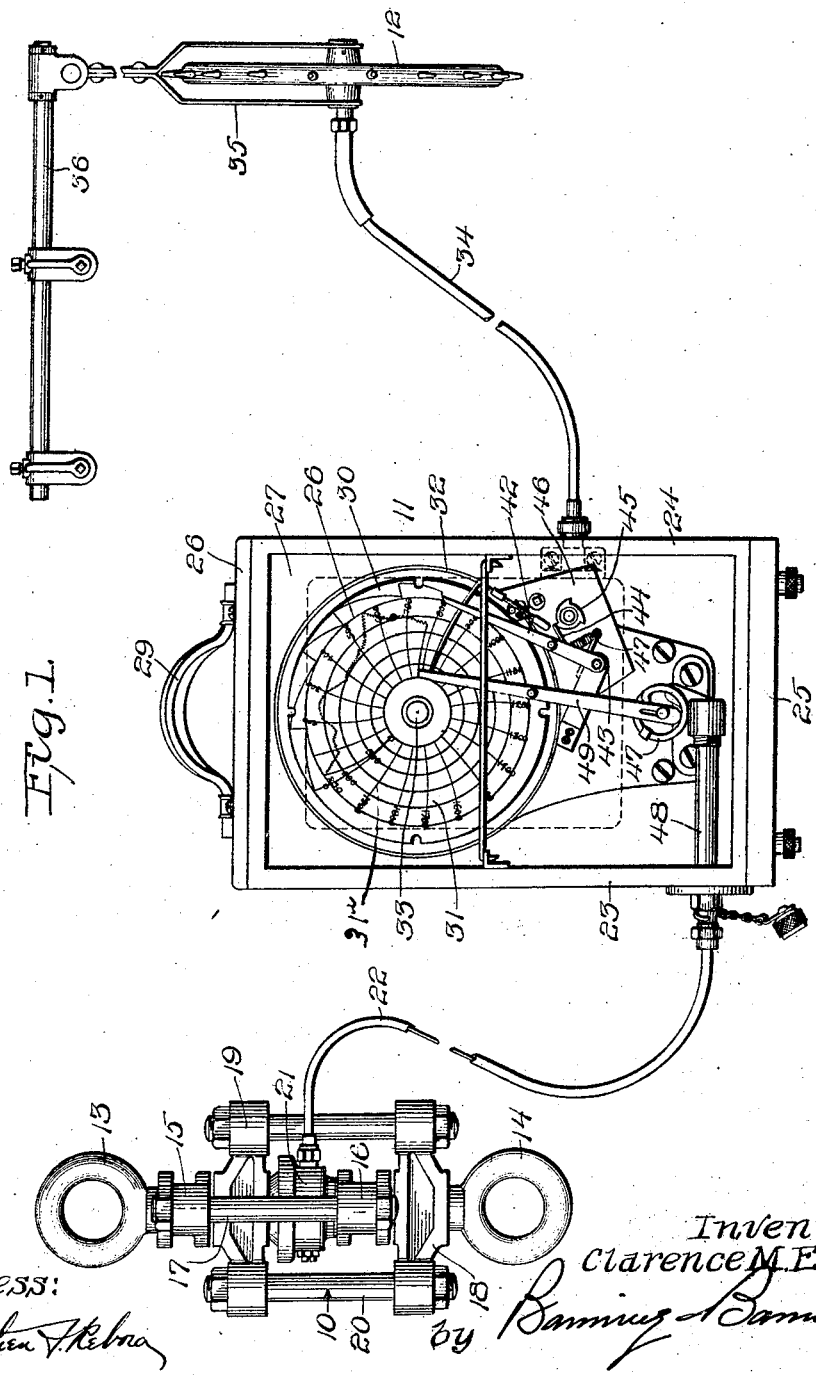

UNITED STATES PATENT OFFICE.

CLARENCE M. EASON, OF MOLINE, ILLINOIS, ASSIGNOR TO HYATT BEARINGS DIVISION, GENERAL MOTORS CORPORATION, OF NEWARK, NEW JERSEY, A CORPORATION OF DELAWARE.

DYNAMOMETER RECORDING INSTRUMENT.

1,417,461.  Specification of Letters Patent.  Patented May 23, 1922.

Application filed May 20, 1920. Serial No. 382,725.

*To all whom it may concern:*

Be it known that I, CLARENCE M. EASON, a citizen of the United States, residing at Moline, in the county of Rock Island and State of Illinois, have invented certain new and useful Improvements in Dynamometer Recording Instruments, of which the following is a specification.

This invention is intended primarily for use in connection with the testing of tractors; and the primary object of the invention is to so construct and arrange the various mechanisms required in the testing of the tractive pull that the delicate recording instrument may be carried at a distance from the tractor itself so that it will not be subject to aberrant influences occasioned by shock or vibration of the tractor when being subjected to test in rough ground and under unequal conditions of draft strain.

The instrument employed consists essentially of a pressure dynamometer which is used as a hitch between the tractor and the plow or other trailing implement, and which is subject to variant compressive influences, depending upon the draft, in combination with a recording instrument embodying a rotating chart on which is inscribed a draft record, a time record, and a speed record, so that all the computations can be made from a reading of the chart which are essential to a full understanding of the ratio between pull, time, and speed of advance, thereby providing all of the data necessary to a full understanding of the efficiency of the tractor.

The invention consists in the features of construction and combinations of parts hereinafter described and claimed.

In the drawings:

Figure 1 is a general elevation, showing the several co-ordinated mechanisms comprising the present invention;

Fig. 2 is a rear elevation of the recording instrument with the back plate removed to expose the interior mechanism; and Fig. 3 is a sectional elevation, showing the rear portion of the casing containing the gear train, and so forth.

The mechanism as a whole comprises a dynamometer 10, a recording instrument 11, and an odometer wheel 12 which rolls over the ground for the purpose of securing a record line indicating units of advance.

The dynamometer 10 may be of any suitable type provided with eye connections 13 and 14 for securing the dynamometer between the tractor and the plow or other trailer. The eye connection 13 is secured to a proximate cross head 15 and a distant cross head 16, which cross heads are connected by spacer bolts 17. The eye connection 14 is likewise secured to a proximate cross head 18 and a distant cross head 19 by means of bolts 20, the cross heads being interengaged and arranged in right angle relation to one another, and serving, when draft is applied to the tractor, to compress a liquid or fluid medium contained within a shell 21, which compression is transmitted through a pipe 22 leading to the recording instrument 11. Since the interior construction of the dynamometer itself is not material to a correct understanding of the present invention it is not deemed necessary to fully explain such interior mechanism.

The recording instrument is in the form of a rectangular box, comprising side walls 23 and 24, a bottom 25, a top 26, a closed front 27, and a back plate 28. The recording instrument is supported by means of a handle 29 and in use can be carried by the observer who walks alongside the tractor and thereby guards the recording instrument against excessive vibration which might tend to impair the accuracy of the record.

The recording instrument employs a circular record chart 30 which has inscribed uniformly spaced concentric record lines 31 and radially inscribed lines 31$^a$, the latter being not truly radial but having a slight element of curvature. The record chart is mounted upon and travels with a circular dial 32 mounted upon a shaft 33 entered through a division plate 34 in the casing. The dial is driven at a speed commensurate with the travel of the odometer wheel 12 over the surface of the ground through the medium of a flexible shaft 34 and mechanisms now to be described.

The odometer wheel is journaled within a bifurcated bracket 35 carried by an arm 36 connected to any suitable portion of the tractor. The flexible shaft 34 is secured to a coupling 37 on the end of a shaft 38 in the recording instrument, which shaft at its end carries a worm 39 meshing with a worm gear 40, which through a suitable train of gearing drives a gear wheel 41 mounted upon the dial shaft 33, so that the rotation of the dial with its record chart will at all times be commensurate with the speed of travel of the tractor.

Upon the chart are inscribed two record lines, one indicating units of time, as for instance the minutes, and the other indicating the pounds of draw bar pull. The time record is inscribed by means of an arm 42 provided at its end with a suitable stylus, which arm is pivoted at its lower end 43 and is provided a short distance above the pivotal point with a finger 44 which rides upon a cam wheel 45 driven at constant speed by suitable clockwork 46. A spring 47 serves to hold the finger 45 in spring tension against the cam wheel, with the result that the inscribing end of the arm will travel inwardly at uniform speed in a radial direction, as compared with the dial shaft 33, until the finger 44 reaches the abrupt face of one of the cam teeth, at which time the inscribing arm will move abruptly outward, thereby establishing a break in the continuity of the record line, which breaks are intended to indicate the uniform periods of time, as, for instance, one minute, so that by an inspection of the record chart with the serrated or saw tooth time record line inscribed thereon it is possible to determine the angle of rotation of the record chart during each minute of time the test continues.

The pressure record is recorded through the action of a Bourdon spring 47 which connects, by means of a tube 48, with the flexible pressure pipe 33 leading to the dynamometer, and the Bourdon spring carries an inscribing arm 49 having a stylus at its free end for recording the pounds pull per unit of rotation of the record chart, and since the latter is rotating in direct ratio to the distance traveled by the tractor, a threefold record will be inscribed upon the record chart. The radial lines on the record chart bear direct ratio to the odometer wheel and indicate distances traveled, and since the record of the pressure gauge stylus shows the draw bar pull, and the clock arm records the time, it is possible to instantly read the distance traveled during each minute and the draw bar pull during the same time and distance traveled.

The operation may be briefly described as follows: The odometer wheel, rolling over the surface of the ground and being provided with spikes or the like to prevent slippage, measures off constant units of advance of the tractor and imparts rotation through the medium of the flexible shaft 34 to the gear train which rotates the dial and record chart. Concurrently with the rotating movement of the chart, variations in the compression of the liquid in the dynamometer will induce variations in the radial position of the inscribing arm 49, which will be recorded in the form of an in and out zigzag line on the record chart, and concurrently with this record the time line will divide the chart into segments variable in angular dimensions in a degree commensurate with the distance of advance during each minute of travel of the tractor. During the test the observer can instantly note variations in the test, due to local ground conditions or other factors, and after the test can permanently file the record chart for future reference. It is obvious that variations in the details of the several mechanisms can be made without departing from the spirit of the invention.

I claim:

1. In a dynamometer recording instrument, the combination of a dynamometer adapted to transmit variations in pressure, an odometer wheel for measuring units of ground travel, a recording instrument comprising a disk-shaped rotatable record chart, connections between the odometer wheel and the disk-shaped chart for rotating the latter at a speed conformable with the rotation of the odometer wheel, an inscribing instrument movable toward and from the center of the disk-shaped chart for inscribing a record line thereon, a connection between the dynamometer and the inscribing instrument for moving the latter responsively to changes in pressure imparted by the dynamometer, and a time recording instrument movable radially across the face of the chart in fixed time relation for inscribing a time record on the variably movable chart, substantially as described.

2. In a dynamometer recording instrument, the combination of a dynamometer adapted to transmit variations in pressure, an odometer wheel for measuring units of ground travel, a recording instrument comprising a disk-shaped rotatable record chart, connections between the odometer wheel and the disk-shaped chart for rotating the latter at a speed conformable with the rotation of the odometer wheel, an inscribing instrument movable toward and from the center of the disk-shaped chart for inscribing a record line thereon, a connection between the dynamometer and the inscribing instrument for moving the latter responsively to changes in pressure imparted by the dynamometer, and a time recording instrument movable at uniform rate in one direction across the face of the chart throughout fixed time intervals and intermittently returning to initial position at fixed time intervals for inscribing a legible time record line on the variably moving chart, substantially as described.

3. In a dynamometer recording instrument, the combination of a dynamometer adapted to transmit variations in pressure, means for measuring units of ground travel, a recording instrument comprising a rotatable record chart, connections between the ground measuring means and the chart for rotating the latter at a speed conformable with the movements of the ground measuring means, an inscribing instrument movable at an angle to the surface movement of the chart for inscribing a record line thereon, a connection between the dynamometer and the inscribing instrument for moving the latter responsively to changes in pressure imparted by the dynamometer, and a time recording instrument movable at a uniform rate in one direction across the face of the chart throughout fixed time intervals and intermittently turning to initial position at fixed time intervals for inscribing a legible time record line on the variably moving chart, substantially as described.

4. In a dynamometer recording instrument, the combination of a dynamometer adapted to transmit variations in pressure, an odometer wheel for measuring the units of ground travel, a manually supported recording instrument comprising a movable record chart, a flexible shaft between the odometer wheel and the record chart for moving the latter in conformity with the movements of the odometer wheel, an inscribing instrument for recording a record line on the movable chart, a flexible tube connection between the dynamometer and the inscribing instrument for moving the latter responsively to changes in pressure imparted by the dynamometer, and a time recording instrument movable at a uniform rate in one direction across the face of the chart throughout fixed time intervals and intermittently returning to initial positions at fixed time intervals for inscribing a legible time record line on the variably moving chart, substantially as described.

CLARENCE M. EASON.